United States Patent [19]

Mulder et al.

[11] 4,404,561
[45] Sep. 13, 1983

[54] RADAR SYSTEM

[75] Inventors: Willem Mulder, Borne; Gerrit van Rooyen, Haaksbergen; Johan M. C. Zwarts, Borne, all of Netherlands

[73] Assignee: Hollandse Signaalapparaten B.V., Hengelo, Netherlands

[21] Appl. No.: 224,514

[22] PCT Filed: Feb. 13, 1980

[86] PCT No.: PCT/NL80/00006
§ 371 Date: Nov. 10, 1980
§ 102(e) Date: Nov. 10, 1980

[87] PCT Pub. No.: WO80/01956
PCT Pub. Date: Sep. 18, 1980

[30] Foreign Application Priority Data

Mar. 14, 1979 [NL] Netherlands ................ 7902009

[51] Int. Cl.³ ................................................ G01S 3/48
[52] U.S. Cl. ................................ 343/16 R; 343/5 NQ; 343/7.7; 343/113 R
[58] Field of Search ............. 343/7.7, 16 R, 113 R

[56] References Cited

U.S. PATENT DOCUMENTS

| 3,049,702 | 8/1962 | Schreitmueller | 343/16 R X |
| 3,281,840 | 10/1966 | Feten | 343/16 R X |
| 3,495,249 | 2/1970 | Downie | 343/16 R X |
| 3,761,927 | 9/1973 | Amoroso, Jr. | 343/16 R |
| 3,766,556 | 10/1973 | Amoroso, Jr. | 343/16 R |

Primary Examiner—T. H. Tubbesing
Attorney, Agent, or Firm—Robert J. Kraus

[57] ABSTRACT

A radar system comprises an antenna including a reflector having two vertically mounted receiving elements and two receiving channels connected to the elements. The receiving elements form, in cooperation with the reflector, almost coinciding cosecant-square beamed patterns. A measuring circuit connected to the two receiving channels measures the phase difference between the signals received by the receiving elements. A transformation unit connected to the phase measuring circuit converts the phase difference to a signal representative of the elevation angle of the target.

4 Claims, 1 Drawing Figure

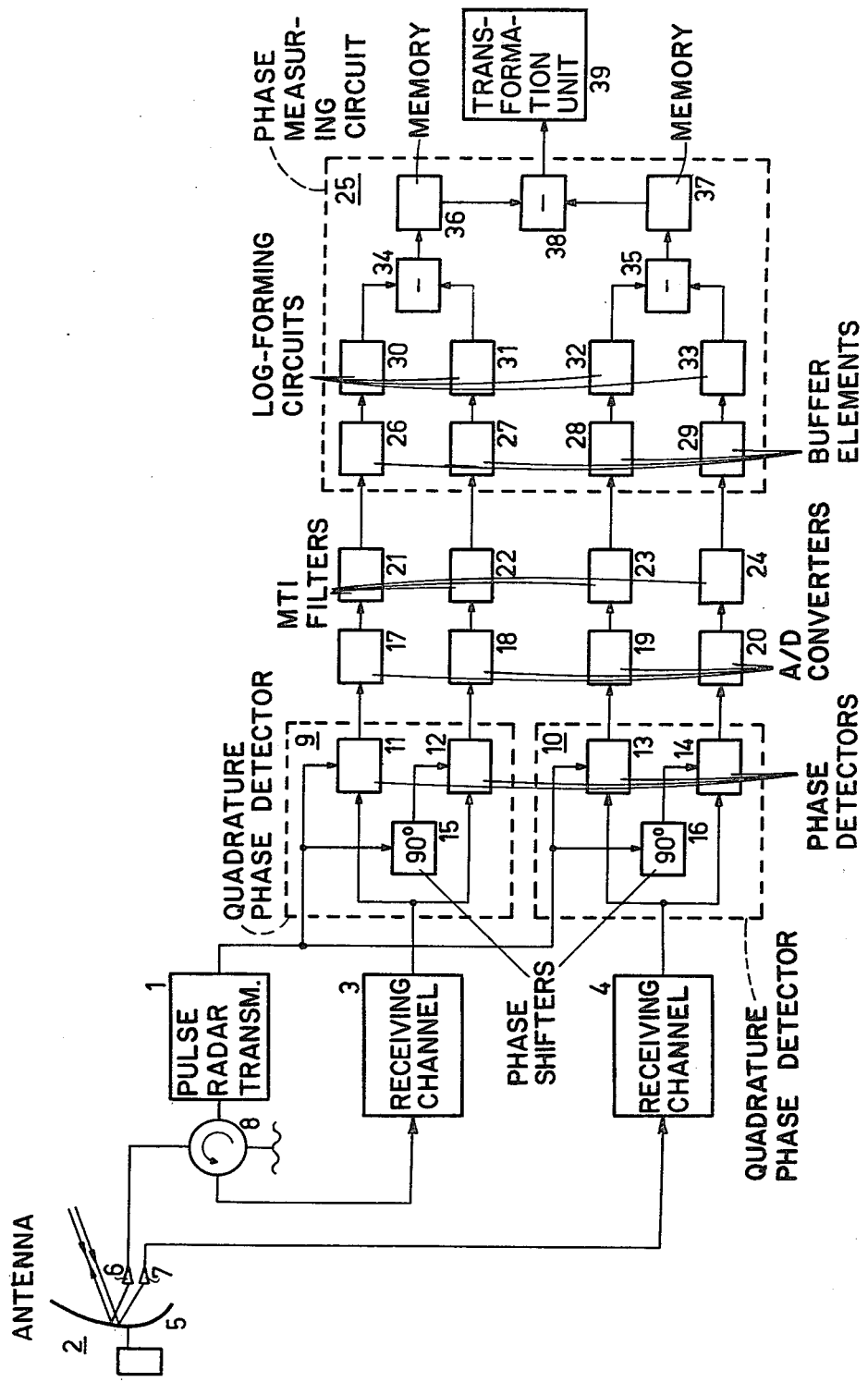

RADAR SYSTEM

BACKGROUND OF THE INVENTION

The invention relates to a radar system comprising an antenna including a reflector and two vertically mounted receiving elements for forming almost coinciding, substantially cosecant-squared beam patterns, and two receiving channels connected to the receiving elements.

A radar apparatus having two partially coinciding beams is known from the Dutch patent application No. 76.12575 corresponding to U.S. Pat. No. 4,136,341. In this patent application the reflector in cooperation with a first receiving element is described as forming a substantially cosecant-squared beam pattern, while the reflector in cooperation with a second receiving element forms a beam pattern that substantially coincides with the most elevated part of the substantially cosecant-squared beam pattern. With such an antenna the radar system described in the cited patent application ensures practically clutter-free reception.

SUMMARY OF THE INVENTION

The present invention has for its object to utilize the radar system set forth in the opening paragraph for determining the angle of elevation of detected targets. The radar system is characterized in that a phase measuring circuit is connected to the two receiving channels for measuring the phase difference $\Delta\phi$ between the signals received by the two receiving elements, and that a transformation unit is incorporated for converting the measured phase difference $\Delta\phi$ into the elevation angle $\epsilon$ at which the target is situated.

The invention is based on the surprising effect that, with a suitably selected reflector and arrangement of the receiving elements, a clear phase difference $\Delta\phi$ manifests itself over a considerable angle of elevation $\epsilon$. For example with a long-range radar, where the radar frequency is in the L band, an unambiguously measured phase difference $\Delta\phi$ corresponds with an elevation $\epsilon$ between 0° and 40°, if the phase centers of the receiving elements are spaced 35 cm–45 cm apart.

The determination of the elevation by phase measurement has been known from prior art for a long time. Radar interferometers of this kind are used in air traffic approach systems. With these systems a plurality of receiving elements are employed, and the elevation angle is determined by interferometric means. Because these systems do not include a reflector, they lack the high gain which is necessary to integrate them in radar systems suitable for long-range operation.

If the radar system according to the invention is subject to clutter, faulty measurements will be made and incorrect elevation angles will be obtained. For this reason it is desirable to equip the radar system with conventional MTI circuitry. To retain the phase information in the received signals quadrature phase detectors are employed.

It will be clear that the present invention is applicable in the most diversified active, passive, pulse- and and continuous-wave radar systems, and that the phase measuring circuit may be used in all kinds of conventional embodiments.

BRIEF DESCRIPTION OF THE DRAWING

A preferable embodiment will now be described with reference to the accompanying FIGURE which schematically illustrates a radar system in accordance with the invention.

DESCRIPTION OF THE PREFERRED EMBODIMENT

In the FIGURE, 1 represents a pulse radar transmitter, 2 an antenna, and 3 and 4 two receiving channels. Antenna 2 consists of a reflector 5 and two vertically mounted radiating elements 6 and 7, of which element 6 functions as transmitting and receiving element and element 7 as receiving element only. The radar pulses generated in transmitter 1 are emitted via a circulator 8 and antenna 2. The echo signals are received by antenna 2 and are converted to i.f. signals in receiving channels 3 and 4. These channels are connected to quadrature phase detectors 9 and 10. Each of detectors 9 and 10 consists of two phase detectors, 11, 12 and 13, 14 respectively, and a 90° phase shifter, 15 and 16 respectively, so that phase detection occurs in two mutually perpendicular components $I_1$, $Q_1$ AND $I_2$, $Q_2$, respectively, using an i.f. signal coherent with the transmitter signal. The signals thus detected are converted into a digital form in an analog-digital converter, 17, 18, 19 and 20, and are applied to a digital MTI filter 21, 22, 23 and 24, respectively. The signals from these filters still contain all phase information. These signals are then sent to a phase measuring circuit 25 to determine the phase difference $\Delta\phi$ between the signals received by the radiating elements 6 and 7 in accordance with the relationship:

$$\Delta\phi = \arctan\frac{I_1}{Q_1} - \arctan\frac{I_2}{Q_2}.$$

The phase measuring circuit comprises: four buffer elements 26, 27, 28 and 29 for temporarily storing the digitized values of $I_1$, $Q_1$, $I_2$ and $Q_2$ from the MTI filters; four units 30, 31, 32 and 33 for converting the buffered values into log $I_1$, log $Q_1$, log $I_2$ and log $Q_2$ respectively; two subtracters 34 and 35 for producing the values log $(I_1/Q_1)$ and log $(I_2/Q_2)$ respectively; two permanent memories 36 and 37 for providing, on the supply of the values log $(I_1/Q_1)$ and log $(I_2/Q_2)$, the corresponding values arctan $(I_1/Q_1)$ and arctan $(I_2/Q_2)$; and a subtractor 38 for obtaining from the values arctan $(I_1/Q_1)$ and arctan $(I_2/Q_2)$ the phase difference $$\Delta\phi = \arctan\frac{I_1}{Q_1} - \arctan\frac{I_2}{Q_2}.$$

A transformation unit 39 is connected to phase measuring circuit 25 for converting the measured phase difference into a corresponding value of the elevation angle $\epsilon$ at which the target, emitting the received signals, was situated. In the embodiment in question transformation unit 39 functions as a pulse modulator that converts the digital phase difference $\Delta\phi$ into a pulse train, of which the number of pulses represents the elevation angle $\epsilon$. Although the transformation unit may be of various designs, such as a permanent memory, a simple design was selected to be able to present, besides the video signal displayed on a PPI, a number of pulses to indicate the elevation angle of the target displayed next to the video signal of this target. The embodiment herein described, with the transmitter frequency lying in the L band, is capable of measuring the phase difference $\Delta\phi$ unambiguously over a 0°–40° elevation interval, if the distance between the phase centers of radiating elements 6 and 7 is selected between 35 and 45 cm, i.e. approximately 1.5 $\lambda$.

We claim:

1. A radar system for determining the angle of elevation of a detected target, comprising:
   (a) an antenna including a reflector and two vertically mounted receiving elements for cooperating to form almost coinciding, substantially cosecant-squared beam patterns;
   (b) two receiving channels electrically-connected to the receiving elements for processing signals from the elements;
   (c) a phase measuring circuit electrically-connected to the receiving channels for measuring the phase difference $\Delta\phi$ between signals processed by the channels; and
   (d) a transformation unit electrically-connected to the phase measuring circuit for converting the phase difference into a signal representative of the elevation angle $\epsilon$ of the target.

2. A radar system as in claim 1, wherein the phase measuring circuit comprises:
   (a) first and second quadrature phase detectors for detecting the signals processed by the receiving channels in two mutually perpendicular components $I_1$, $Q_1$ and $I_2$, $Q_2$; and
   (b) phase measuring means for determining the phase difference $\Delta\phi$ in accordance with the relationship $\Delta\phi = \arctan I_1/Q_1 - \arctan I_2/Q_2$.

3. A radar system as in claim 2, including a plurality of MTI filter circuits electrically-connected between the phase detectors and the phase measuring means for filtering respective ones of the components $I_1$, $Q_1$, $I_2$, $Q_2$.

4. A radar system as in claim 1, wherein the transformation unit comprises a pulse modulator for converting the phase difference $\Delta\phi$ into a pulse train in which the number of pulses represents the elevation angle $\epsilon$.

* * * * *